No. 625,394. Patented May 23, 1899.
C. HOOK.
NUT MILL.
(Application filed Apr. 5, 1898.)

(No Model.)

Witnesses:
M. G. Spencer
Jas. W. Graham

Inventor.
Charles Hook
By Fred L. Chappell
Atty.

THE NORRIS PETERS CO., PHOTO-LITHO., WASHINGTON, D. C.

UNITED STATES PATENT OFFICE.

CHARLES HOOK, OF BATTLE CREEK, MICHIGAN, ASSIGNOR TO JOSEPH LAMBERT, OF SAME PLACE.

NUT-MILL.

SPECIFICATION forming part of Letters Patent No. 625,394, dated May 23, 1899.

Application filed April 5, 1898. Serial No. 676,523. (No model.)

*To all whom it may concern:*

Be it known that I, CHARLES HOOK, a citizen of the United States, residing at Battle Creek, in the county of Calhoun and State of Michigan, have invented certain new and useful Improvements in Nut-Mills, of which the following is a specification, reference being had therein to the accompanying drawings.

This invention relates to an improved mill for grinding and reducing to a pulp or paste the kernels of nuts or other similar material.

The mill is particularly valuable and useful in making what has come to be known as "nut-butter" from peanuts.

The main object of the invention is to provide a simple and efficient mill easy to operate and manage to accomplish this purpose of reducing nut-kernels or similar material to a paste or butter.

Further and minor objects will appear from the detailed description to follow.

The structure is clearly described in the specification.

The invention is clearly defined and pointed out in the claims.

The mill is fully illustrated in the accompanying drawings, forming a part of this specification, in which—

Figure 1:
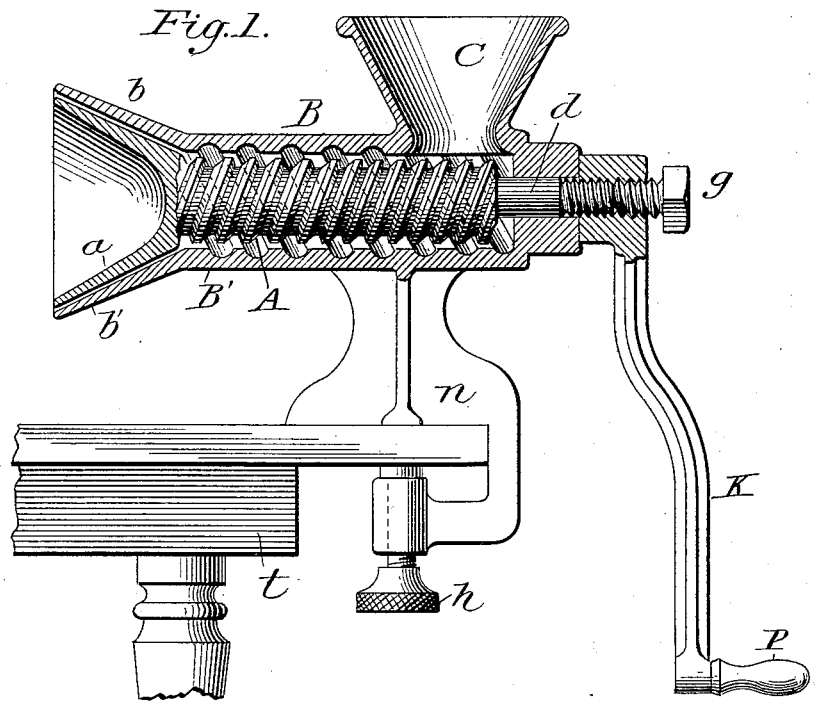
Figure 2:
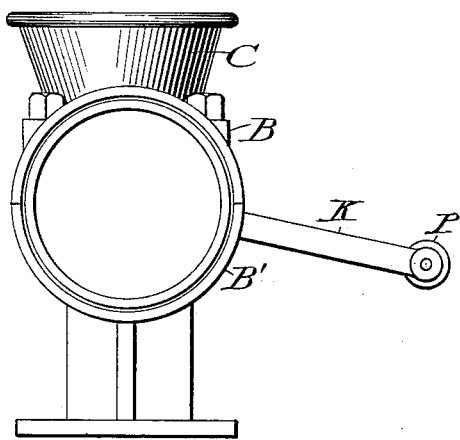

Figure 1 is a detail vertical longitudinal central sectional view of my improved mill. Fig. 2 is an end elevation of the same, taken from the right-hand end of Fig. 1.

Similar letters of reference refer to similar parts throughout both views.

Referring to the lettered parts of the drawings, A represents the grinder, having the enlarged smooth conical front end $a$. At the rear end is a journal or shank $d$, the rearwardly-projecting end of which is threaded or otherwise adapted to receive a crank P K, which is the means preferably provided for operating the machine. This crank is preferably adjustable on the shank $d$ to regulate the closeness of fit. This I have shown accomplished by set-screw $g$; but I am well aware that other ways are equally available. The body of the grinder is provided with a rather coarse screw-thread leading up to the smooth conical portion. A casing B surrounds the grinder. The front portion $b$ is flaring and exactly fits the conical portion $a$ of the grinder. The body of the casing is provided on its interior with grooves, or ribs forming grooves, preferably spiral and extending across the corresponding threads of the grinder. A feed-hopper C is provided at the top of said casing, preferably toward its rear end. The rear is provided with an axial journal-bearing to receive the journal $d$. The casing is provided with a bracket $n$, with thumb-nut $h$ to secure it to a bench or table when in use. When the mill is for permanent and continuous use in one place, it would be best to secure it permanently in position by any well-known means.

I have shown the various parts of the casing and grinder integral. They might be built up of parts and the same action be secured. To secure the best results, the screw portions of the grinder and case should fit closely; but it is not absolutely necessary that they rub on each other at this point. The closer the fit the better the work, so long as the grinder is free to move. The screw-threaded portions of the casing and grinder should, however, be sufficiently close for the one screw to coact with the other to force the material forward.

In operation nut-kernels are placed in the hopper C, the grinder is turned, and the screw-portion forces the meats toward the forward end, cutting and crushing the same as they advance until the smooth rubbing portion is reached. The screw fitting closely within the case forces the oily mass into the rubbing-space by a strong pressure and all granules are broken and rubbed and finally discharged as a paste or butter at the forward end of the casing from between the close-fitting portions $a$ $b$.

The structure could be much modified. It is preferred to have the smooth rubbing part conical in form on account of convenience of adjustment. It is not an absolute requirement so long as a smooth rubbing-surface is provided.

Having thus described my invention, what I claim as new, and desire to secure by Letters Patent, is—

1. In a mill for grinding nuts or for similar purposes the combination of a casing with a hopper at its rear end with internal grooves within the same leading toward the forward end and with a flaring forward end provided on its interior with a smooth rubbing-surface; a grinder fitting within said casing provided with a coarse screw-thread extending across the grooves of said casing and with its forward end enlarged in conical form and provided with a smooth rubbing-surface corresponding to the rubbing-surface of said casing; and means of rotating the girder within said casing coacting for the purpose specified.

2. In a mill for grinding nuts or for similar purposes the combination of a casing with a hopper at its rear end with internal grooves within the same leading toward the forward end and the forward end provided on its interior with a smooth rubbing-surface; a grinder fitting within said casing provided with a coarse screw-thread extending across the grooves of said casing with its forward end provided with a smooth rubbing-surface corresponding to the rubbing-surface of said casing; and means of rotating the grinder within said casing coacting for the purpose specified.

In testimony whereof I affix my signature in presence of two witnesses.

CHARLES HOOK.

Witnesses:
ROY T. FISH,
CARL PETERS.